May 30, 1967 W. P. HANEY 3,321,998
CRANK FOR SEMI-TRAILER LANDING GEAR
Filed May 21, 1964 3 Sheets-Sheet 1

INVENTOR.
William P. Haney
BY
Wood, Herron & Evans
ATTORNEYS

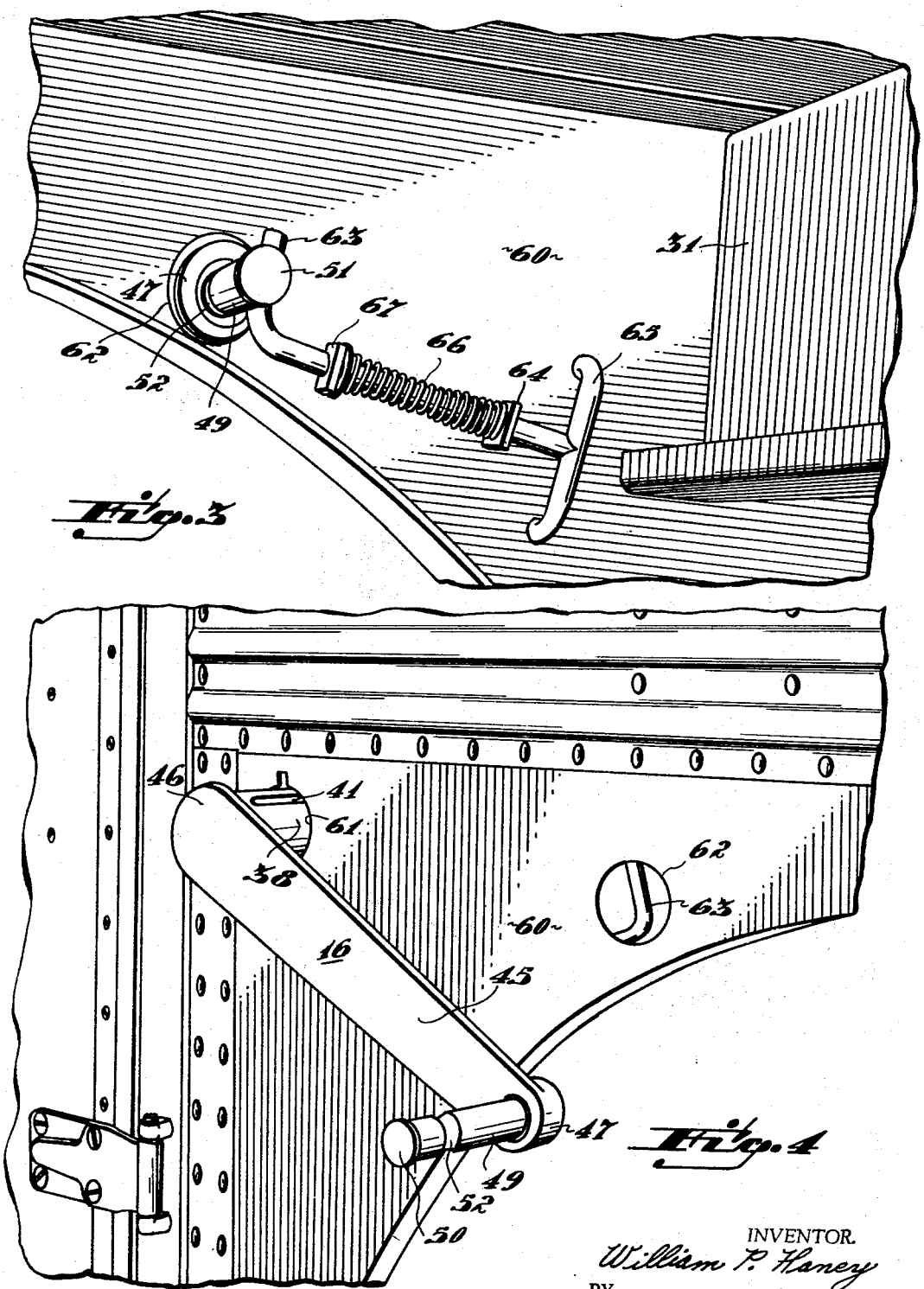

May 30, 1967 W. P. HANEY 3,321,998
CRANK FOR SEMI-TRAILER LANDING GEAR
Filed May 21, 1964 3 Sheets-Sheet 3
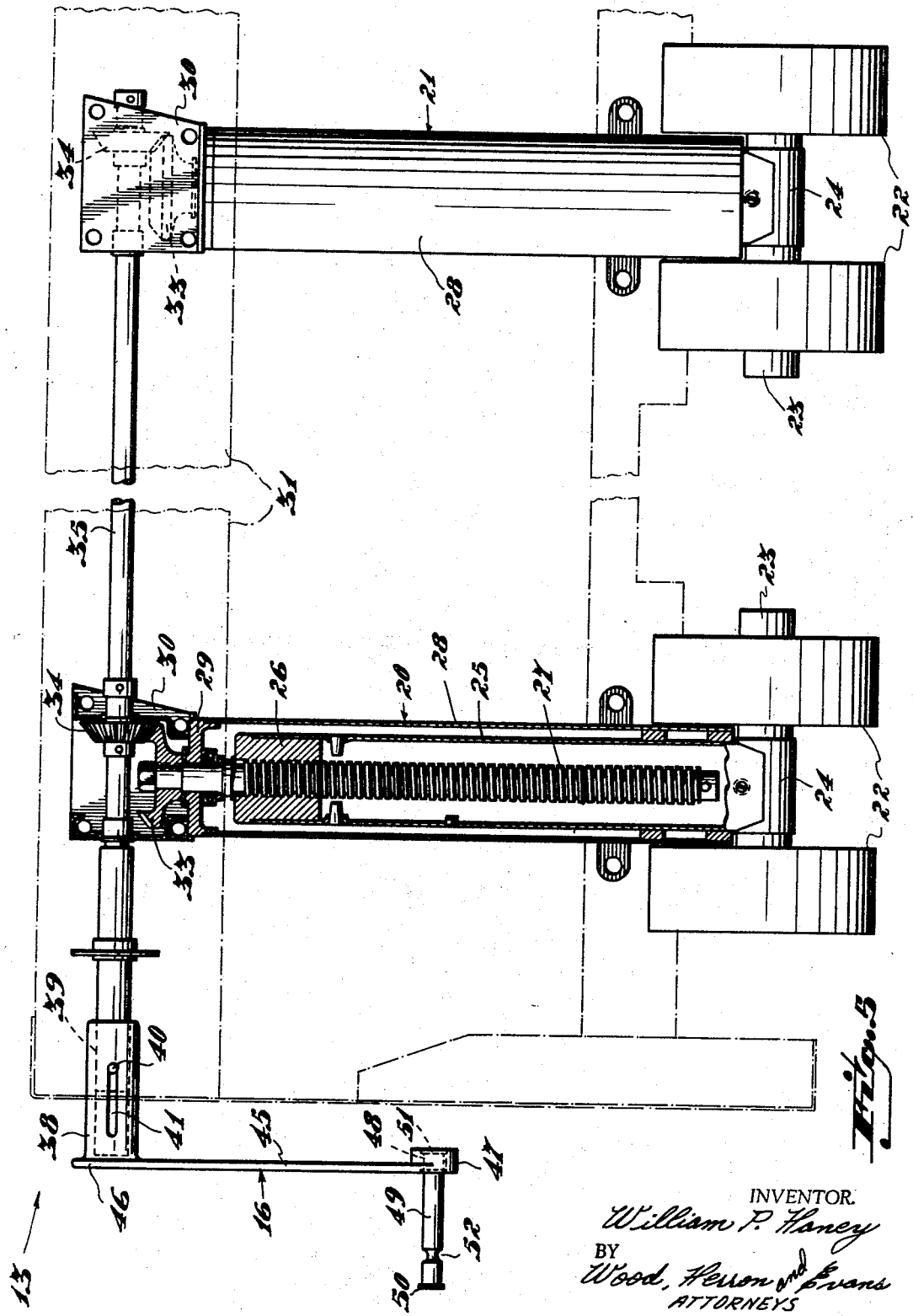
INVENTOR.
William P. Haney
BY
Wood, Herron and Evans
ATTORNEYS

United States Patent Office 3,321,998
Patented May 30, 1967

3,321,998
CRANK FOR SEMI-TRAILER LANDING GEAR
William P. Haney, Cincinnati, Ohio, assignor to Pullman Incorporated, Chicago, Ill., a corporation of Delaware
Filed May 21, 1964, Ser. No. 369,107
5 Claims. (Cl. 74—547)

ABSTRACT OF THE DISCLOSURE

A truck trailer landing gear crank arrangement having a crank lever arm having its upper portion slidable on the crank drive shaft and having the lower arm portion provided with a handle slidably through the lower portion of the crank arm, both the slidable crank arm portion and the lower slidable handle being slidably received in openings in the side wall of the trailer for storage of the crank lever arm adjacent the trailer side wall and the handle in an out-of-way position, the crank lever arm and the handle being held in the out-of-way position by a biased locking structure on the inside of the trailer side wall, the locking structure biasingly engaging the handle for fixing the handle and the crank lever arm.

---

Figure 1:
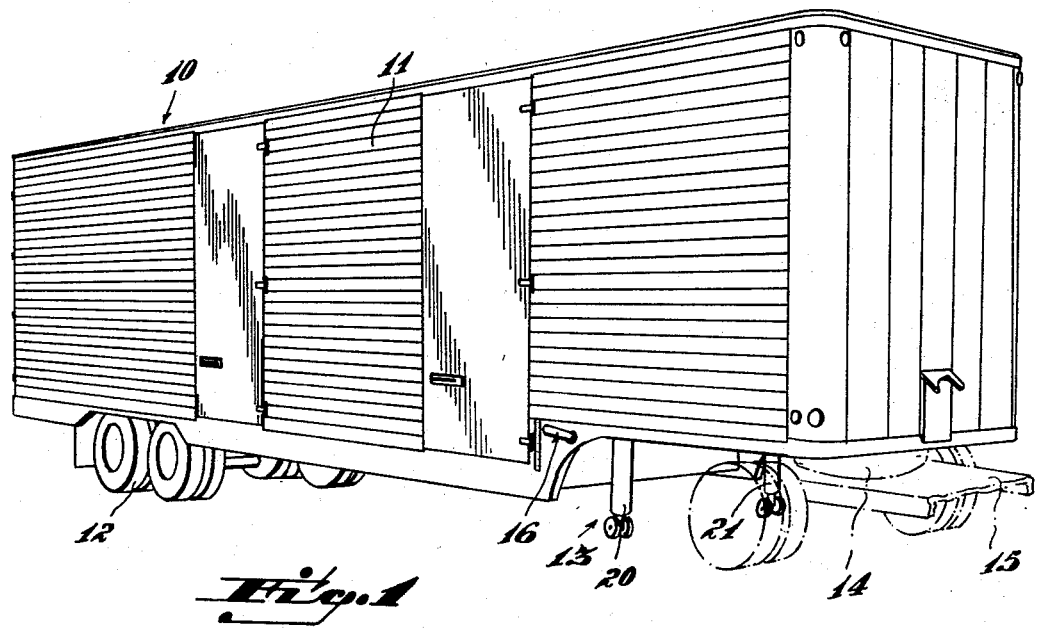

This invention relates to a hand crank for operating the landing gear on a semi-trailer.

The invention will be described with particular reference to a furniture van for it is with that type of semi-trailer that a particular problem is encountered, that problem having given rise to the present invention which is a solution to it. The specific reference here to a furniture van is not to be considered a limitation upon the scope of the invention.

The landing gear with which the invention is employed is located rearwardly of the upper fifth wheel of the semi-trailer, and is operated by a rotatable shaft which extends transversely of the semi-trailer and has a crank at one of its ends. The crank permits the vehicle operator to raise and lower the landing gear in a well-known manner. In a furniture van, that portion of the van immediately to the rear of he fifth wheel is of a drop construction to increase the load capacity of the van. The landing gear is located immediately adjacent the drop construction and its operating shaft is concealed behind side plates or skirts which extend down from the side walls of the van. It has been the practice to provide a hole through the side skirts to provide access for the attachment of a crank to the landing gear operating shaft. It has further been the practice to provide for the removability of the crank in order to provide assurance that no crank will project beyond the side wall of the van during normal operating conditions. The principal disadvantage of this common practice is that the crank is often lost.

The objective of the invention has been to provide a crank which remains in operative engagement with the landing gear operating shaft even under normal operating conditions of the vehicle, but which is maintained out of the way or in a storage position during such normal operating conditions. The crank of the present invention is easily and substantially instanteous shifted from its storage position to an operative position in which it projects a normal distance beyond the side walls of the vehicle, in which position it is fully satisfactory for cranking landing gear up or down.

It has been another objective of the invention to provide, in a landing gear of the type described, means for locking the crank in its storage condition. Since the crank is maintained in operative engagement with the landing gear shaft, the locking of the crank prevents the rotation of the landing gear shaft and thereby prevents the inadvertent jiggling down of the landing gear through the vibration of the vehicle as it travels over the highways. To this end, the invention contemplates the provision of spring biased lock mechanism which is automatically operated when the crank is moved to storage position and which requires no more than a one second operation to free the crank for shifting to an operative position.

The principal objectives of the invention are attained through the provision of a crank which slidably engages the landing gear shaft at one end, the crank having at its other end a transversely slidable handle. The van skirt has an operating hole aligned with the landing gear shaft through which crank projects and, spaced from the operating hole, a storage hole into which the slidable handle can be pushed to a storage position. The introduction of the handle into its storage hole locks the crank against rotation and thereby locks the landing gear operating shaft. Additionally, means are provided to lock the sliding handle thereby providing assurance that the operating handle will not inadvertently slide out of the storage hole to effect the release of the lock.

Figure 2:
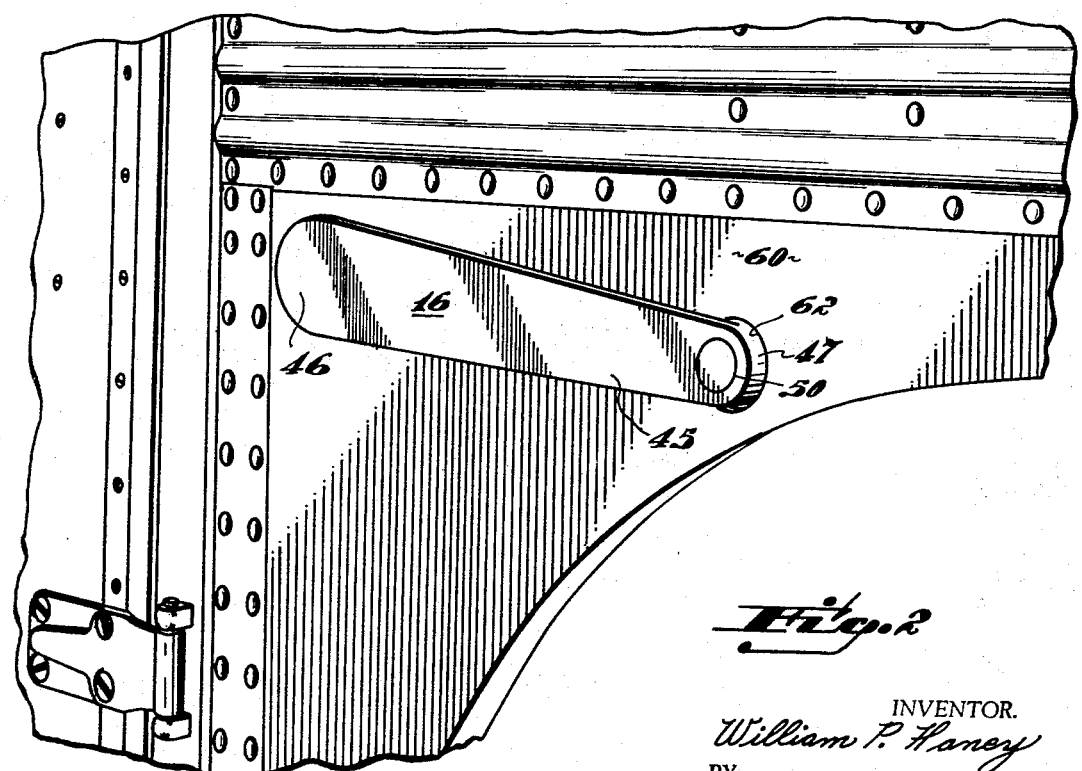

The several objectives of the invention will become more readily apparent from the following detailed description taken in conjunction with the accompanying drawings in which:

FIG. 1 is a perspective view of a furniture van employing the present invention, FIG. 2 is a fragmentary perspective view of the van showing the operating handle in storage position, FIG. 3 is an enlarged fragmentary view taken from the opposite side of the skirt showing the lock for the crank handle, FIG. 4 is a fragmentary perspective view similar to FIG. 2 showing the crank handle in its operative position, and FIG. 5 is an elevational view, partly in section, showing the landing gear and the crank shaft.

A van with which the present invention is used is shown in FIG. 1. The van indicated at 10 has a cargo container 11 which is supported at its rear end by a tandem suspension 12 and at its forward end by a landing gear 13 when the van is not in use or by the lower fifth wheel 14 of a tractor 15 partially illustrated in broken lines.

The landing gear is operated to raise or lower it by a crank 16 to which the present invention is directed. The operation of the crank and its relationship to the landing gear and other vehicle structure can best be understood by reference to FIG. 5 in which the landing gear structure is shown. The landing gear is constituted by two extendable legs 20 and 21, each having a pair of ground engaging wheels 22 at its lower end. The wheels are mounted on an axle 23 which is fixed to the lower end 24 of an inner telescoping tube 25. The telescoping tube has a nut 26 fixed to its upper end, the nut having internal threads which engage a screw 27. The inner telescoping tube, its nut, and the screw 27 are encased by an outer tube 28 whose upper end 29 is fixed to a bracket 30, the bracket 30 being bolted or welded to a crossbolster 31 shown in broken lines.

The screw 27 has a bevel gear 33 fixed to its upper end, the bevel gear 33 being engaged by a bevel gear 34 which is fixed on an operating shaft 35. The operating shaft 35 interconnects the two extendible legs 20 and 21 to provide for their snychronized operation. The shaft 35 is operated by the crank 16. The crank has a coupling in the form of a sleeve 38 which slides over the end 39 of the shaft 35. The end 39 has a pair of pins 40 projecting radially outwardly, the pins being engaged in a slot 41 of the sleeve 38. The slot and pin connection 40, 41 permits the sleeve 38 to slide longitudinally with respect to the shaft 35, but fixes the sleeve rotationally with respect to the shaft.

The extension and retraction of the landing gear is effected by the rotation of the crank 16. When the crank is rotated, the shaft 35 is rotated. The shaft 35, operating through the beveled gears 33 and 34 causes the rotation of the screw 27. The rotation of the screw 27 causing the inner telescoping tube 25 and its ground engaging wheels 22 to raise or lower depending upon direction of rotation of the crank.

The crank has a lever arm 45 which is fixed at one end 46 to the sleeve 38. At the other end 47, the lever arm has a transverse bore 48 into which a handle 49 is slidably mounted. The handle 49 has flanges 50 and 51 at each end which retain the handle in the bore 48. The handle has an annular groove 52 spaced a short distance from the flange 50, the groove 52 forming a part of the locking system as will be described below.

The structure with which the crank coperates to provide the storage and locking feature is illustrated in FIGS. 2, 3, and 4. It should be understood that the van structure which gives rise to the problem is the plate or skirt 60 which depends from the side wall of the van and blocks access to the operating shaft 35. It has been the practice to provide a hole 61 in the corner formed between the horizontal forward bottom structure of the van and the vertical wall formed by the drop bottom. A removable crank is inserted in that hole when it is necessary to operate the landing gear, but that crank has to be removed during normal operation of the vehicle.

As illustrated in FIGS. 2–4, it is a feature of the present invention to provide a second hole 62 which is spaced from the hole 61 a distance sufficient to receive the slidable handle 49. When the handle 49 is inserted in the hole 62 it is not only maintained in a storage position in which it lies substantially flush with the side wall of the van, but additionally the engagement of the handle with the skirt structure forming the hole 62 provides a lock of the crank against rotation and prevents the jiggling down of the landing gear during normal roadway operation.

To provide assurance that the handle 49 will remain in the storage, locking position, a spring loaded latch 63 is provided (FIG. 3). The latch is slidably mounted on a bracket 64 and is operated by a handle 65. A compression spring 66 is mounted on the handle and bears against the bracket 64 at one end and against a lug 67 at the other end, the lug 67 being fixed to the latch 63. The spring urges the latch toward operative engagement with the annular groove 52 of the crank handle 49.

In operation, the latch 63 is pulled away from the handle and the handle is withdrawn from the hole 62 and is slid with respect to the lever arm 45 a distance sufficient to bring it into operative position as shown in FIGS. 4 and 5. The sleeve 38 at the other end of the crank is also slid outwardly so that the lever arm 45 will clear all projections on the van wall during the operation of the crank.

The loading gear is raised or lowered as required by rotating the crank and the crank is then returned to its storage position. The return is effected by sliding sleeve 38 inwardly on shaft 35 until the lever arm 45 lies against the skirt 60. The crank handle 49 is pushed into hole 62 until the latch 63 engages groove 52 to hold the handle in. The holding of the handle in a storage position also holds the arm 45 and sleeve 38 in storage position by the engagement of flange 50 with the arm 45.

I claim:

1. For a vehicle having a landing gear, a rotatable shaft for operating said landing gear and a landing gear crank storage and lock plate depending from the side of said vehicle adjacent said landing gear, storable mechanism for rotating said shaft comprising,
   a crank having a central lever arm, said plate having an operating hole,
   a coupling fixed at one end of said lever arm and passing through the operating hole in said plate into driving engagement with said shaft,
   said coupling being slidable with respect to said shaft to permit said crank to move toward and away from said plate,
   a handle slidably mounted at the other end of said lever arm and generally perpendicularly to said lever arm,
   said plate having a storage hole spaced from said operating hole to receive said handle,
   and means for locking said handle in said storage hole for storage of the crank lever arm adjacent the plate and the handle in an out-of-way position.

2. For a vehicle having a landing gear, a rotatable shaft for operating said landing gear and a landing gear crank storage and lock plate depending from the side of said vehicle adjacent said landing gear, storable mechanism for rotating said shaft comprising,
   a crank having a central lever arm, said plate having an operating hole,
   a coupling fixed at one end of said lever arm and passing through the operating hole in said plate into driving engagement with said shaft,
   said coupling being slidable with respect to said shaft to permit said crank to move toward and away from said plate,
   a handle slidably mounted at the other end of said lever arm and generally perpendicularly to said lever arm,
   said plate having a storage hole spaced from said operating hole to receive said handle,
   said handle having an annular groove intermediate its end,
   and a spring loaded latch movably mounted on said plate and biased for engagement with said annular groove to lock said handle in said storage hole for storage of the crank lever arm adjacent the plate and the handle in an out-of-way position.

3. For a vehicle having a landing gear, a rotatable shaft for operating said landing gear and a landing gear crank storage and lock plate depending from the side of said vehicle adjacent said landing gear, storable mechanism for rotating said shaft comprising,
   a crank having a central lever arm, said plate having an operating hole,
   means extending through the operating hole in said plate and slidably connecting one end of said central lever arm to said shaft,
   a handle slidably mounted at the other end of said lever arm and generally perpendicularly to said lever arm,
   said plate having a storage hole spaced from said operating hole to reciprocably receive said handle,
   and means for locking said handle in said storage hole for storage of the crank lever arm adjacent the plate and the handle in an out-of-way position.

4. For a vehicle having a landing gear, a rotatable shaft for operating said landing gear and a landing gear crank storage and lock plate depending from the side of said vehicle adjacent said landing gear, storable mechanism for rotating said shaft comprising,
   a crank having a central lever arm, said plate having an operating hole,
   means extending through the operating hole and slidably connecting one end of said central lever arm to said shaft,
   and a handle slidably mounted at the other end of said lever arm and generally perpendicularly to said lever arm,
   said plate having a storage hole spaced from said operating hole to receive said handle for storage of the crank lever arm adjacent the plate and the handle in an out-of-way position.

5. For a vehicle having a landing gear, a rotatable shaft for operating said landing gear and a landing gear crank storage and lock plate depending from the side of said vehicle adjacent said landing gear, storable mechanism for rotating said shaft comprising,
- a crank having a central lever arm, said plate having an operating hole,
- a coupling fixed at one end of said lever arm and passing through the operating hole in said plate into driving engagement with said shaft,
- said coupling being slidable with respect to said shaft to permit said crank to move toward and away from said plate,
- a handle slidably mounted at the other end of said lever arm and generally perpendicularly to said lever arm,
- flanges on the ends of said handle to limit movement of said handle relative to said lever arm,
- said plate having a storage hole spaced from said operating hole to receive said handle,
- and means for locking said handle in said storage hole for storage of the crank lever arm adjacent the plate and the handle in an out-of-way position.

References Cited
UNITED STATES PATENTS

| | | | |
|---|---|---|---|
| 1,059,884 | 4/1913 | Link | 74—550 |
| 1,106,969 | 8/1914 | Putman | 74—547 X |
| 1,367,359 | 2/1921 | Divine | 74—547 X |
| 1,419,597 | 6/1922 | Woodward | 74—483 |
| 1,928,487 | 9/1933 | Hammerly | 74—547 X |
| 2,499,625 | 3/1950 | Black | 280—150.5 X |

FOREIGN PATENTS 715,435   9/1931   France.

FRED C. MATTERN, Jr., *Primary Examiner.*

C. F. GREEN, *Assistant Examiner.*